United States Patent

Blinow et al.

[11] 3,709,122
[45] Jan. 9, 1973

[54] FILM ADVANCING APPARATUS
[75] Inventors: Igor Blinow, Millis; Robert D. Leduc, Marlboro, both of Mass.
[73] Assignee: Polaroid Corporation, Cambridge, Mass.
[22] Filed: May 10, 1971
[21] Appl. No.: 141,553

[52] U.S. Cl. ..................................... 95/11 R, 95/13
[51] Int. Cl. .......................................... G03b 19/02
[58] Field of Search ............................... 95/11 R, 13

[56] References Cited

UNITED STATES PATENTS

| | | | |
|---|---|---|---|
| 3,563,145 | 2/1971 | Bendoni | 95/13 |
| 3,511,152 | 5/1970 | Erlichman | 95/13 |
| 3,447,437 | 6/1969 | Tiffany | 95/13 |
| 3,589,262 | 6/1971 | Chen | 95/13 X |

Primary Examiner—Samuel S. Matthews
Assistant Examiner—Kenneth C. Hutchison
Attorney—Brown & Mikulka and Alfred E. Corrigan

[57] ABSTRACT

Photographic apparatus including a motor mounted near one end of a film positioning structure, a pair of rolls mounted adjacent an opposite end of the positioning structure and an elongated gear train extending between the motor and the rolls and along a side of the film positioning structure. Film-advancing apparatus is actuated by a component of the gear train to move an exposed film unit from its exposure position within the positioning structure into the bite of the rolls for subsequent movement of the film unit toward the exterior of the apparatus. A latch is provided for disenabling the film-advancing apparatus from moving another film unit from its exposure position until the preceding film unit has moved out of engagement with the rolls.

14 Claims, 4 Drawing Figures

PATENTED JAN 9 1973
3,709,122
SHEET 1 OF 2
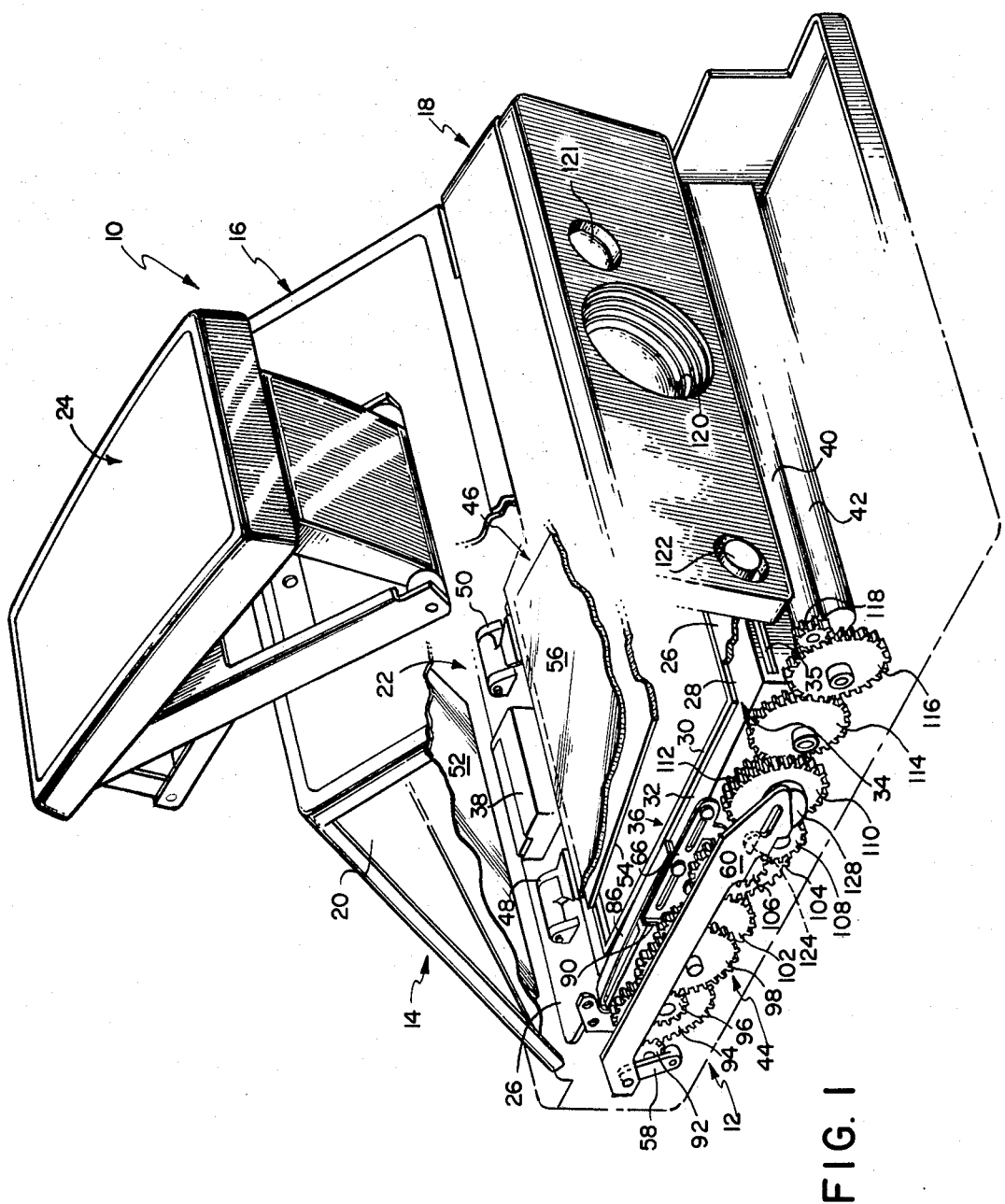
FIG. I
INVENTORS
IGOR BLINOW
ROBERT D. LEDUC
BY Brown and Mikulka
and
Alfred E. Corrigan
ATTORNEYS

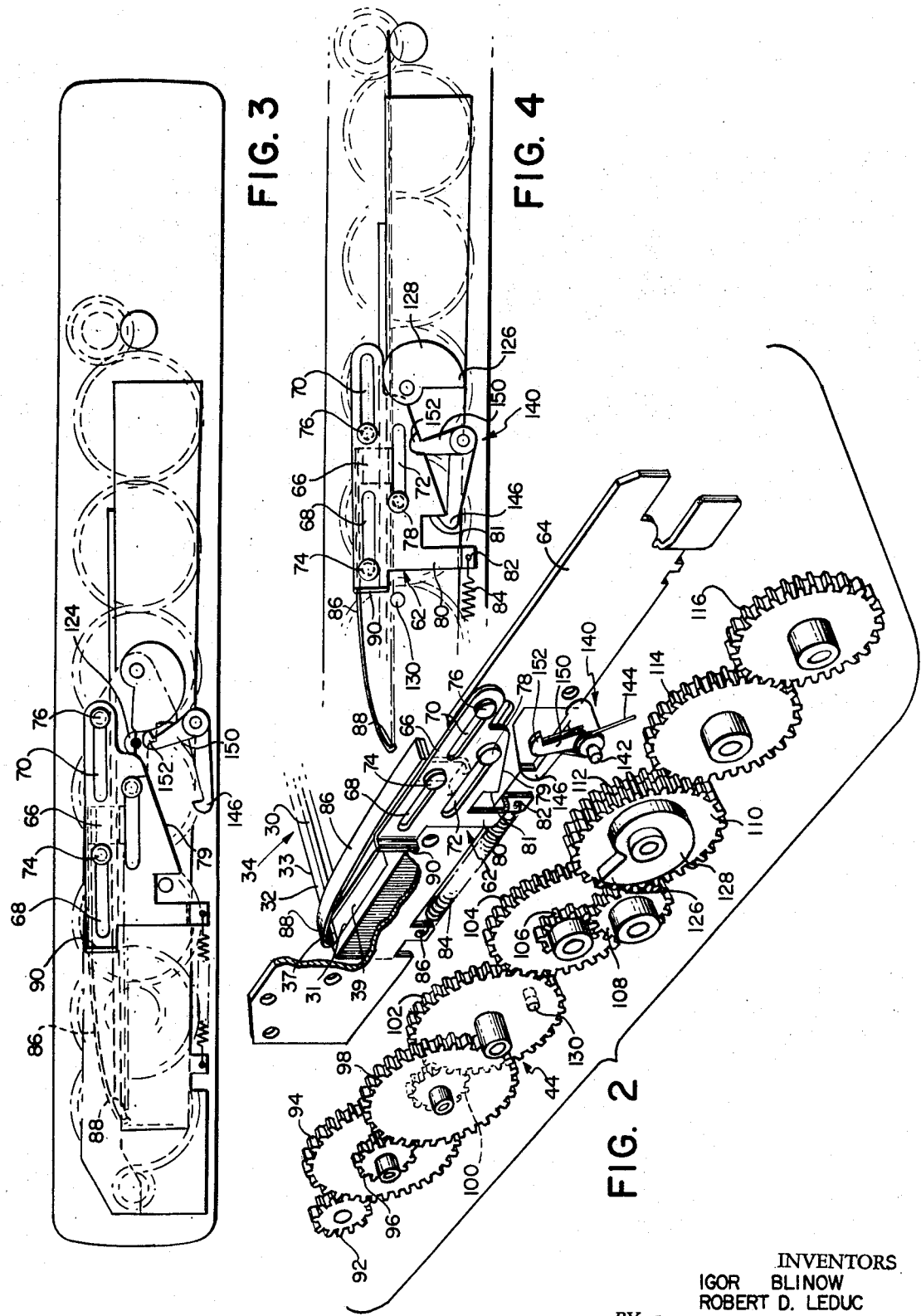

FILM ADVANCING APPARATUS

BACKGROUND OF THE INVENTION

1. Field of the Invention

This invention relates to apparatus for moving a film unit out of its exposure position subsequent to exposure.

2. Description of the Prior Art

The photographic industry has long sought a compact, fully automatic camera which would deliver to the operator, in a minimum amount of time, a photograph which needs no further mechanical processing. The operator of such a camera would merely have to focus the scene to be photographed and then, upon actuation of the camera shutter release button, the remaining functions associated with the photographic process would be performed automatically. One obstacle to the realization of the aforementioned camera has been the failure to correctly marry or join the various sub-systems required for an automatic camera within a space which would constitute a slim, compact structure capable of being conveniently carried in the operator's pocket.

One proposed solution to this problem is described in U.S. Pat. No. 3,563,145, granted to L. Bendoni et al. and assigned in common herewith. Bendoni et al. show film-advancing apparatus for advancing an exposed film unit into the bite of a pair of rolls and means for simultaneously driving the film-advancing apparatus and the rolls. The film-advancing apparatus is provided with a disenabling apparatus including a pair of arms for preventing the withdrawal of a second film unit until another exposure has been made. While this system works well, it is possible, according to the instant invention, to marry the various sub-systems of a slim, compact camera in a manner which approaches the apotheosis of utilization of space, thereby generating additional space within the original confines of the camera for other desirable sub-systems, e.g., a single-lens reflex type viewing system for optimum viewing.

SUMMARY OF THE INVENTION

The invention relates to film-advancing means for use with e.g., self-developing cameras of the single-lens reflex type, and more particularly, to a marriage between the film-advancing means or apparatus and other sub-systems of the camera to provide a structure which is slim, compact and readily lends itself to transport within a user's pocket. The camera is provided with structure for supporting and positioning a film cassette in position for exposure of one of the film units contained therein, a motor mounted near one end of the film cassette positioning structure, and transport means in the form of a pair of rolls mounted adjacent an opposite end of the structure. A gear train extends along one side of the cassette positioning structure for operatively coupling the rolls with the motor. Film-advancing apparatus is positioned adjacent the gear train and is adapted to be moved by means mounted on the gear train in a direction toward the rolls for advancing a film unit of the type shown in U.S. Pat. No. 3,415,644 from the cassette into the bite of the rolls. The rolls are adapted to rupture a container of processing liquid located near the leading edge of the film unit to spread the liquid contained therein in contact with photosensitive and image-receiving elements of the film unit to initiate a diffusion transfer process. The film unit is subsequently delivered by the rolls to the operator of the camera in a condition which does not need any further mechanical processing.

The slim compactness of the instant camera is accomplished by properly marrying various sub-systems of the camera, e.g., the film-advancing apparatus, the rolls, and the gear train. This proper marriage is accomplished, in part, by structuring one of the sub-systems, i.e., the gear train, to perform several functions in cooperation with the film-advancing apparatus. As stated hereinabove, means such as a pin, is mounted on one of the gears of the gear train and is adapted to engage and move the film-advancing apparatus toward the rolls as the gear is rotated. The gear ratio between the various gears in the train is such that the gear carrying the pin moves through more than one revolution for each actuation of the camera shutter button. Accordingly, in order to prevent the withdrawal of more than one film unit from the cassette for each exposure, a latch member is provided for engaging and holding the film-advancing apparatus in its forwardmost position, i.e., near the end of its travel toward the rolls, for a predetermined period of time, e.g., a period of time at least as long as that necessary to move the film unit out of engagement with the rolls. The latch member includes a cam follower which cooperates with a cam located on one of the other gears in the train to release the latch and allow the film-advancing apparatus to return to its original position under the influence of a spring. The timing between the cam and follower is such that the latch member is released from its engagement with the film-advancing apparatus just prior to the gear train being de-energized, thereby insuring the withdrawal of only one film unit for each exposure or operating cycle of the gear train.

Another feature of the invention resides in the cooperation between the film-advancing apparatus, the gear train, and the means for moving the camera's reflecting member from its exposure position to its viewing position, whereby the film-advancing apparatus is actuated to move an exposed film unit into the bite of the driven rolls before energy from the gear train is used to move the reflecting member into the viewing position. By operating the film-advancing apparatus and the reflecting member at different times, a possible overload on the camera's motor is prevented.

An object of the invention is to provide in photographic apparatus of the type including means for positioning a film cassette in position for exposure of one of the film units within the cassette, a motor located near one end of the positioning means, a pair of rolls located adjacent the opposite end of the positioning means and a gear train extending between the motor and the rolls and along one side of the positioning means, means for coupling film-advancing apparatus to the gear train for moving the film-advancing apparatus from a first position to a second position to advance a film unit into the bite of the rolls.

Another object of the invention is to provide in photographic apparatus of the type set forth above, means for retaining the film-advancing apparatus in the second position for a period of time at least sufficient for the film unit to move out of engagement with the rolls.

Another object of the invention is to provide in photographic apparatus of the type including film-advancing apparatus for moving a film unit from its exposure position into the bite of a pair of rolls and motion-transmitting means coupled between a motor and the film-advancing apparatus for transmitting power from the motor to the film-advancing apparatus, first means coupled to the motion-transmitting means for moving the film-advancing apparatus from a first position to a second position to move a film unit into the bite of the rolls, second means for maintaining the film-advancing apparatus in the second position for a predetermined period of time, and third means coupled with the motion-transmitting means and the second means for enabling the film-advancing apparatus to return to the first position after the expiration of the predetermined period of time.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view, partly in section, of a folding type, self-developing camera of the single-lens reflex type which incorporates the instant invention;

FIG. 2 is an enlarged, exploded perspective view of certain components of the camera shown in FIG. 1;

FIG. 3 is an elevational view of the components of FIG. 2 shown in an assembled condition; and FIG. 4 is a view similar to FIG. 3 showing the relationship between components during an intermediate phase of their operation.

DETAILED DESCRIPTION OF THE INVENTION

Reference is now made to FIG. 1 of the drawings wherein is shown a foldable camera 10 of the self-developing, single-lens reflex type similar to that shown in the copending application of P. Costa et al., entitled, "Folding Camera", Ser. No. 141,554 filed on even date herewith and assigned to the same assignee as the instant application. As more fully described in the aforementioned application, camera 10 includes a plurality of housing sections 12, 14, 16 and 18 which cooperate with a flexible opaque bellows 20 to define sides of an exposure chamber 22. Housing sections 12, 14, 16 and 18 are pivotally coupled for movement, along with a collapsible viewfinder 24, from the operative position shown to a folded or collapsed position wherein the camera 10 assumes a slim, compact configuration which readily lends itself to carriage in the pocket of the user.

Housing section 12 includes a generally rectangular shaped member 26 having a rectangular shaped opening 28 therein. Opening 28 is adapted to receive an upstanding rib 30 located on the forward wall 32 of a film cassette 34 for properly positioning the forwardmost film unit located within the cassette in position for exposure to light transmitted through cassette exposure opening 36. A spring wound or battery driven motor 38 is located near one end of opening 28 and a pair of rolls 40 and 42 is mounted adjacent an opposite end of opening 28. Motion-transmitting means in the form of a gear train 44 extends along one side of member 26 and is coupled between the motor 38 and the roll 40 for driving the latter in a counterclockwise manner (as viewed in FIG. 1) to transport a film unit engaged between the rolls toward the exterior of the camera.

Camera 10 is provided with a reflecting member 46 pivotally attached to rectangular shaped member 28 at lugs 48 and 50 for movement between a viewing position wherein it cooperates with rib 30 on cassette 34 to define a lighttight seal therebetween and an exposure position wherein it lies closely adjacent a mirror 52 mounted on an interior surface of housing section 14. The reflecting member 46 includes a support (not shown) having a mirror or similarly specularly reflecting surface 54 on one side thereof and a viewing surface 56 on the other side configured to have a texture and optical design to facilitate focusing of the image. Reflecting member 46 is spring loaded to the up or exposure position and is provided with a linkage system including a crank 58 and ram 60 for moving the reflecting member 46 to the down or viewing and focusing position.

Camera 10 is further provided with film-advancing apparatus for engaging a film unit, subsequent to exposure, and moving it into the bite of rolls 40 and 42 for subsequent delivery to the user of the camera. The film-advancing apparatus (see FIG. 2) includes a generally T-shaped member 62 mounted on a flange 64 for reciprocating motion, i.e., toward and away from the rolls 40 and 42. T-shaped member 62 includes a main body portion 66 having three elongated slots 68, 70 and 72 therein which are adapted to slideably receive pins 74, 76 and 78 mounted on flange 64. Pins 74, 76 and 78 have enlarged end portions for retaining T-shaped member 62. Member 62 further includes a leg 80 having a hole 82 therein for receiving one end of a spring 84. Spring 84 has its other end connected at 86 to flange 64 for resiliently biasing T-shaped member 62 toward the left, i.e., away from the rolls 40 and 42. A resilient arm 86 extends from one end of T-shaped member 62 and includes a downwardly turned film-engaging section 88 which is adapted to engage the trailing end of a film unit prior to moving it out of the cassette 34 and into the bite of rolls 40 and 42. Also extending from T-shaped member 62 is a flange 90 which is adapted to be engaged by means to be described later for moving the film-advancing apparatus from the position shown in FIG. 2 to a second position wherein the film unit is advanced into engagement with the rolls.

Returning briefly to the gear train 44, it can be seen that it includes a plurality of gears 92 – 116. The gear train includes two power paths, i.e., one which couples the gear 118 located on one end of roll 40 with drive gear 92 and a second path which interconnects drive gear 92 with a timing gear 110. The first path includes drive gear 92 (which is coupled to the motor 38), idler gears 94, 98, 102, 104, 112, 114 and 116, reduction gears 96 and 100, integral with gears 94 and 98, respectively, and roll drive gear 118. The second path includes drive gear 92, idler gears 94, 98, 102, 104 and 108, reduction gears 96, 100, 106, and timing gear 110. Obviously, timing gear 110 rotates completely independent of idler gear 112 and reduction gear 106 is integral with idler gear 104.

During the focusing mode of operation, reflecting member 46 is in the down position closely adjacent the film container 34; the camera's shutter and lens assembly 120 is open to allow the entry of light into chamber 22; and the remaining sub-systems, i.e., the gear train 44, ram 60 and crank 58 assume the positions shown in FIGS. 1 and 3. After the image has been properly focused on viewing surface 56, as seen through viewfinder 24, the camera's shutter release button 122 is depressed to initiate operation of the camera's control program as more fully described in the commonly assigned copending applications of Edwin H. Land et al., Ser. No. 134,733 filed Apr. 16, 1971 and entitled, "Reflex Camera", and Edwin K. Shenk, Ser. No. 134,725 filed Apr. 16, 1971 and entitled, "Reflex Camera with Motor Drive." Initiation of the control program fully closes the shutter 120 and closes the circuit to motor 38. Motor 38 drives the gear train 44 for a period of time sufficient to rotate a point on timing gear 110 counterclockwise through an angle of approximately 10°. As noted previously, reflecting member 46 is spring biased toward the up position. However, reflecting member 46 is prevented from moving to the up position because of its connection with link 58 and ram 60. Ram 60 (see FIG. 1) has a cam follower 124 mounted on one side thereof which is in engagement with the high point 126 of a cam 128 fixedly mounted on timing gear 110, when the image is being focused. Rotation of timing gear 110 moves the high point 126 of cam 128 to a position allowing the ram 60, which is being urged to the right by the reflecting member up springs, to move to the right as the reflecting member moves to the up or exposure position. The shutter 120 is then opened and image producing light is directed along an optical path and reflected by mirror 54 toward cassette 34 to expose the forwardmost film unit, i.e., the one closest to wall 32 of cassette 34. A photocell 121 provides an input to the control system for closing the shutter when the correct exposure time has elapsed. After the shutter has been closed, the motor 38 is started again to drive the gear train 34. This second starting of the motor 38 rotates gear 102 and pin 130, which extends from gear 102 inwardly toward frame member 64, in a clockwise direction. During this rotation, pin 130 revolves into a position wherein it engages flange 90 and moves the film-advancing apparatus including film-engaging section 88 to the right (as viewed in FIG. 1) to move the exposed film unit into the bite of the rotating rolls 40 and 42. As best seen in FIG. 2, film cassette 34 has an elongated opening 31 in wall 32 which extends part way down the trailing end wall 33 of the cassette. Opening 31 allows film-engaging section 88 to extend into the cassette to a position just rearwardly of the trailing end 37 of a film unit 39 in preparation for moving the film unit through opening 35 (see FIG. 1) in cassette 34 and into the bite of rolls 40 and 42. Rolls 40 and 42 apply compressive pressure to a container of processing liquid located near the leading edge of the film unit to rupture the container and spread the contents thereof between the photosensitive and image-receiving elements of the film unit to initiate a diffusion transfer process of the type described in U.S. Pat. No. 3,415,644. After the processing liquid has been spread, rolls 40 and 42 transport the film unit to the operator of the camera in a condition which does not require any other mechanical processing. Shortly after the film unit has passed from engagement with the driven rolls 40 and 42, the high point 126 on cam 128 rotates to a position in which it now drives cam follower 124 and ram 60 to the left, thereby driving reflecting member 46 to the down position. The shutter 120 now is allowed to assume a fully open condition and the circuit to the motor 38 opened to complete the cycle.

The gear ratio between the various gears in gear train 44 is such that gear 102 must rotate through more than one revolution in order for the rolls 40 and 42 to be driven a sufficient period of time to move the exposed film unit out of engagement with the rolls. For that reason, a disenabling means in the form of a latch 140 is provided for holding T-shaped member 66 in the second position, i.e., to the right, for a period of time at least sufficient to enable the exposed film unit to move out of engagement with the rolls 40 and 42. By thus holding T-shaped member 66 in the second position, flange 90 is maintained in a position which precludes repeated engagement by pin 130 during subsequent revolutions of gear 102 and the resulting actuation of the film-advancing apparatus to move another film unit out of the cassette 34 before the film unit has been exposed. Latch 140 is pivotally coupled to flange 64 by a pin 142 and is resiliently biased in a clockwise direction by any suitable means such as spring 144. Latch 140 includes a detent 146 which is adapted to be cammed downwardly against its spring bias by inclined surface 79 of T-shaped member 66 as the latter moves toward the right. When T-shaped member 66 reaches its second position, i.e., the film unit is now in the bite of the rolls 40 and 42 and the T-shaped member is in the position shown in FIG. 4, detent 146 is urged by spring 144 in a clockwise direction into a recess 81 in T-shaped member 66 to releasably retain the latter against movement to the left under the influence of spring 84. A release member including an arm 150 having a cam follower 152 at its end extends from latch 140 and is adapted to be engaged by film-advancing peripheral surface of cam 128 for rotating latch 140 in a counterclockwise direction to move detent 146 out of recess 81, thereby allowing T-shaped member 66 to return to its first or starting position (see FIG. 3) under the influence of spring 84. This latter movement of arm 150 from the position shown in FIG. 4 to the unlatching position occurs just prior to cam 128 rotating in a counterclockwise manner into the position shown in FIG. 3. Accordingly, cam 128 functions to drive reflecting member 46 to the down position and as an enabling means for permitting the film-adancing apparatus to return to the position shown in FIG. 3.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:

means for positioning a plurality of film units in position for sequential exposure;

motor means mounted adjacent one end of said positioning means;

transport means for engaging and moving a film unit, said transport means being mounted adjacent an opposite end of said positioning means;

motion-transmitting means coupled to said motor means and extending along one side of said positioning means;

means extending from said motion-transmitting means for engaging and driving film-advancing means; and film-advancing means engageable by said means extending from said motion-transmitting means for moving said film-advancing means from a first position to a second position to advance an exposed film unit from said positioning means into engagement with said transport means.

2. Photographic apparatus as defined in claim 1 wherein said transport means are coupled to said motion-transmitting means for simultaneous operation with said film-advancing means.

3. Photographic apparatus as defined in claim 2 further including preventing means for disenabling said film-advancing means from returning to said first position for a predetermined period of time.

4. Photographic apparatus as defined in claim 3 further including enabling means coupled to said motion-transmitting means and engageable with said disenabling means for enabling said film-advancing means to return to said first position after said predetermined period of time.

5. Photographic apparatus as defined in claim 4 wherein said predetermined period of time is at least equal to that necessary to move an exposed film unit out of engagement with said transport means.

6. Photographic apparatus as defined in claim 1 wherein said motion-transmitting means includes a plurality of gears extending from said motor to said transport means.

7. Photographic apparatus as defined in claim 1 further including reflecting means coupled to said motion-transmitting means for movement from an exposure position to a viewing position and means coupled to said motion-transmitting means for moving said film-advancing means to said second position prior to said reflecting means being moved to said viewing position.

8. Photographic apparatus as defined in claim 1 wherein said film-advancing means includes flange means extending toward said motion-transmitting means and adapted to be engaged by said means extending from said motion-transmitting means for moving said film-advancing means from said first position to said second position.

9. Photographic apparatus comprising: a motor;

film-advancing means adapted to move an exposed film unit from an exposure position as said film-advancing means moves between first and second positions;

motion-transmitting means coupled between said motor and said film-advancing means for transmitting motion from said motor to said film-advancing means;

first means coupled to said motion-transmitting means for moving said film-advancing means from said first position to said second position to advance the exposed film unit from said exposure position;

second means for maintaining said film-advancing means in said second position for a predetermined period of time; and third means coupled to said motion-transmitting means and adapted to move said second means to a position in which said film-advancing means is enabled to return to said first position.

10. Photographic apparatus as defined in claim 9 wherein said apparatus further includes transport means coupled to said motion-transmitting means and mounted in position to receive the exposed film unit as it is advanced from said exposure position by said film-advancing means and move the exposed film unit toward the exterior of the photographic apparatus.

11. Photographic apparatus as defined in claim 10 wherein said predetermined period of time is at least as long as that necessary to move the exposed film unit from engagement with said transport means.

12. Photographic apparatus as defined in claim 9 wherein said motion-transmitting means includes a plurality of gears, said first means being mounted on one of said gears and said third means being mounted on another of said gears.

13. Photographic apparatus as defined in claim 12 wherein said third means includes a cam.

14. Photographic apparatus as defined in claim 9 wherein said apparatus further includes reflecting means coupled to said motion-transmitting means for movement from an exposure position to a viewing position, said first means being adapted to move said film-advancing means from said first position to said second position prior to said reflecting means being moved from said exposure position to said viewing position.

* * * * *